Aug. 31, 1937.  J. A. INNES  2,091,594
AIR CONDITIONING APPARATUS FOR AUTOMOBILES
Filed Aug. 27, 1935
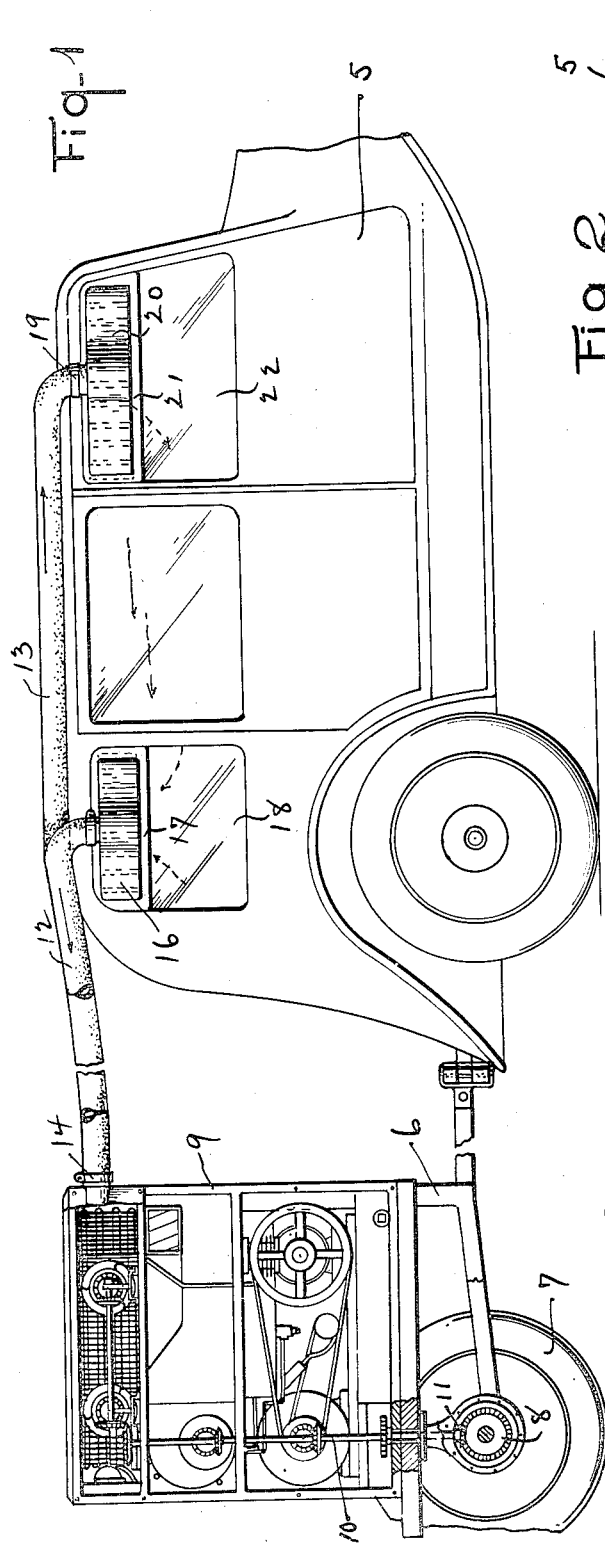
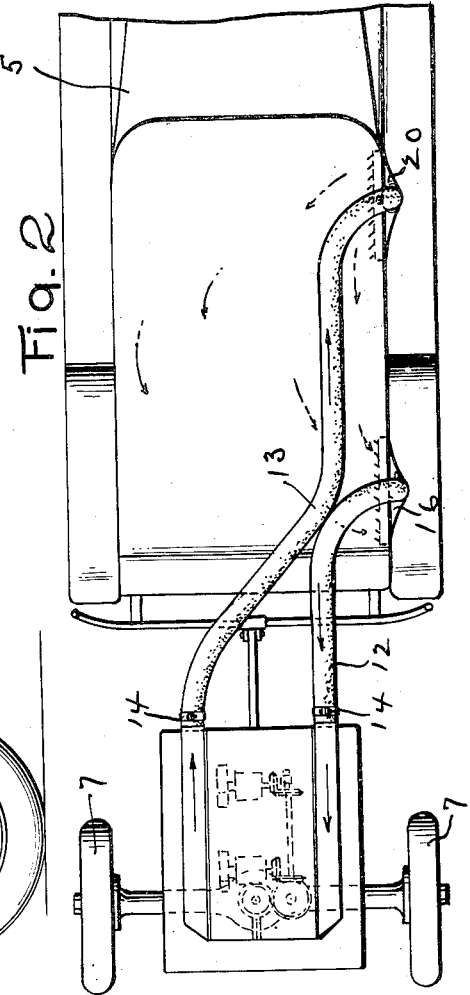
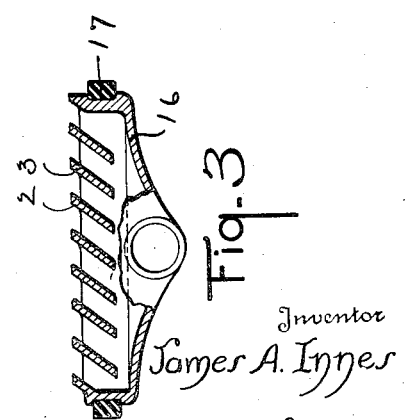
Inventor
James A. Innes
Philip E. Diggers
Attorney Patented Aug. 31, 1937

2,091,594

UNITED STATES PATENT OFFICE 2,091,594

AIR CONDITIONING APPARATUS FOR AUTOMOBILES

James A. Innes, Kimball, Minn.

Application August 27, 1935, Serial No. 38,091

3 Claims. (Cl. 257—18)

This invention relates to an air-conditioning apparatus for motor vehicles and among other objects aims to provide an improved construction and arrangement of parts which will drive cooled and dehumidified air to the interior of a passenger automobile or bus and which will also withdraw air from the same to be cooled and recirculated. Other more specific objects of the invention will be apparent from the following description of a preferred embodiment of the invention which is illustrated in the accompanying drawing forming a part of this specification.

In said drawing,—

Fig. 1 is a sectional elevation showing part of an automobile to which is attached the improved air-conditioning apparatus;

Fig. 2 is a fragmentary plan view of the same but on a reduced scale;

Fig. 3 is an enlarged sectional view showing one of the nozzles for driving air to or evacuating air from the motor vehicle.

Referring particularly to the drawing, there is shown a passenger vehicle 5 to which is attached a trailer 6, supported by two conventional wheels 7, said trailer being of any known construction and being attached to the rear end of the automobile in any known or approved way. The trailer has a differential 8 permitting the wheels 7 to turn at different speeds and the body of the trailer carries an air-conditioning apparatus 9 of known construction and hence unnecessary to describe in detail. To supply power for the air-conditioning apparatus so that the same may not only cool and dehumidify the air, but may also drive considerable quantities of air to the motor vehicle 5, the differential 8 is modified to receive the drive shaft 10 and gear 11 by which drive shaft 10 is driven. The various operating parts of the air-conditioner 9 are driven from the drive shaft 10 which extends substantially vertical to the upper compartment of the air-conditioner, as shown. It will be obvious that, if desired, the air-conditioner may be operated by power derived directly from a wheel 7 instead of from the differential 8. It is also within the scope of my invention to drive the air-conditioning unit 9 from the rear wheel of the motor vehicle 5 as by means of a shaft having universal joints and the necessary gearing. The arrangement shown is preferred simply because the driving mechanism may be enclosed and thus protected from dirt, the weather, etc., and hence is more likely to give long service.

In accordance with the invention, the top of the air-conditioning unit 9 is connected by means of two hose lines or conduits 12, 13, with the motor vehicle in a manner to be described. Preferably a fabric hose of known type is used, being secured by standard couplings 14 to the air-conditioning unit. The forward end of the hose 12 is attached by means of a coupling 15 to a nozzle 16 which preferably is adapted to fit the rear side window of the motor vehicle 5. To facilitate the connection, the nozzle 16 is preferably surrounded by an adapter 17 which may be of rubber or other soft resilient material which will seal the opening in the window and which will receive the upper edge of the window glass 18 to form a seal therewith without any possibility of breaking said window glass. It will be understood that the nozzle 16 should be a standardized article adapted to fit almost any automobile window while the rubber adapter 17 will be specially cut to fit the window of different models of cars. The forward end of the hose 13 is connected by coupling 19 with a nozzle 20 which delivers air to the forward end of the vehicle at the top thereof and preferably at the top of the side window adjacent to the driver's seat. The nozzle 20 is surrounded by an adapter 21 similar to the adapter 17 forming a seal with the window glass 22. The nozzle 16, shown separately in Fig. 3, is similar to the nozzle 20 except for a slight difference in dimensions and arrangement of its vanes 23, the vanes 23 being set at a different angle from the vanes forming a part of the nozzle 20 as is indicated in Fig. 2. These vanes not only serve to direct the air currents properly but also protect the interior of the nozzle against choking up with trash, etc.

It will be understood that the hose 12 and 13 preferably are clamped or otherwise held against lateral movement across the top of the motor vehicle. It will also be understood that if desired, the return conduit 12 may be dispensed with and the warm air may escape from the vehicle by means of one of the windows which can be lowered slightly to permit the escape of warm air. Also the conduits 12 and 13 may be connected to the top of the motor vehicle through the roof of the car by means of special couplings, permitting detachment of conditioner in cool weather. The described arrangement is preferable because it does not require any modification of the structure of the car, which may therefore be used in cool weather without any indication that the air-conditioning apparatus is attached to it during the hot months.

The described invention provides a readily attachable and detachable unit which may be rented by the owner of a car during a hot spell or during an extended trip in a desert or tropical country. The apparatus will maintain a comfortable temperature in any passenger vehicle even when the temperature outside is very high and, if used with tightly closed windows, as it should be, all dust, insects, etc., will be kept out of the car and nothing but pure clean air will be breathed by its occupants.

Obviously the present invention may be employed in several forms neither shown nor described.

Having described a preferred embodiment of the invention, what I claim as new and desire to secure by Letters Patent is:

1. In combination with a motor vehicle of the type which may be substantially completely closed to the atmosphere, a trailer hitched to the motor vehicle; an air-conditioning unit carried by the trailer and operated by power derived from travel of the motor vehicle; and a flexible conduit delivering air from the air-conditioning unit to the interior of the vehicle.

2. In combination with a motor vehicle of the type which may be substantially completely closed to the atmosphere, a trailer hitched to the motor-vehicle; an air-conditioning unit carried by the trailer and operated by power derived from rotation of the railer wheels; and a pair of conduits connecting the interior of the motor vehicle with the air-conditioning unit.

3. In combination with a motor vehicle of the type which may be substantially completely closed to the atmosphere, an air-conditioning unit attached to the motor vehicle so as to be operated by power generated by travel of said motor vehicle; and flexible conduits connecting the interior of the motor vehicle with said air-conditioning unit; said conduits having outlets and inlets fitting some of the windows of the motor vehicle so that said motor vehicle may be closed and all air circulating through the interior of the motor vehicle may be conditioned air from said air-conditioning unit.

JAMES A. INNES.